(12) United States Patent
Sakai

(10) Patent No.: US 7,272,100 B2
(45) Date of Patent: Sep. 18, 2007

(54) OPTICAL HEAD APPARATUS

(75) Inventor: Hiroshi Sakai, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 503 days.

(21) Appl. No.: 10/856,622

(22) Filed: May 27, 2004

(65) Prior Publication Data

US 2005/0030879 A1   Feb. 10, 2005

(30) Foreign Application Priority Data

May 28, 2003   (JP) .............................. 2003-150278

(51) Int. Cl.
*G11B 7/135*   (2006.01)
*G11B 7/00*    (2006.01)

(52) U.S. Cl. ............................ 369/112.21; 369/112.28; 369/112.16

(58) Field of Classification Search ............ 369/112.21, 369/112.16
See application file for complete search history.

(56) References Cited

U.S. PATENT DOCUMENTS

| | | | | |
|---|---|---|---|---|
| 2,403,731 | A | * | 7/1946 | MacNeille ................... 359/488 |
| 6,014,254 | A | * | 1/2000 | Cheng ......................... 359/484 |
| 6,181,666 | B1 | * | 1/2001 | Miyazaki et al. ....... 369/112.01 |
| 6,728,193 | B1 | * | 4/2004 | Uchizaki et al. ........ 369/112.01 |
| 2004/0264344 | A1 | * | 12/2004 | Ogata .................... 369/112.01 |

\* cited by examiner

*Primary Examiner*—Wayne Young
*Assistant Examiner*—Parul Gupta
(74) *Attorney, Agent, or Firm*—Reed Smith LLP

(57) ABSTRACT

The present invention is for providing optical head apparatus that can control scatter occurring at locations along the length of the optical path, when laser beam is transmitted through prism constituting the No. 1 prism structural member and the No. 2 prism structural member joined through partially reflecting face. Optical head apparatus 1 performs information recording, information regeneration on an optical recording medium, e.g. DVD; laser beam emitted from laser beam-emitting element is transmitted through a prism. The prism has the structure wherein triangular the No. 1 prism structural member and similarly a triangular No. 2 prism structural member are joined through partially reflecting face.

4 Claims, 3 Drawing Sheets

OPTICAL HEAD APPARATUS

CROSS-REFERENCE TO RELATED APPLICATIONS

This application claims priority of Japanese Application No. 2003-150278, filed May 28, 2003, the complete disclosure of which is hereby incorporated by reference.

BACKGROUND OF THE INVENTION a) Field of the Invention

This invention relates to optical head apparatus used in recording, regeneration for optical recording medium such as DVD (digital versatile disk).

b) Description of the Related Art

In optical head apparatus used in recording, regeneration for optical recording disk such as CD (compact disk) and DVD, in general, a laser beam-emitting element, a prism for the incident laser beam emitted from this laser beam-emitting element, a collimating lens to convert laser beam transmitted through this prism to parallel light flux, and an objective lens to condense parallel light flux emitted from collimating lens on optical recording medium, are located on an optical path in this order.

Here, the prism is used as an optical path synthesis element or optical path separation element. For example, in an optical system shown in FIG. 1, it is used as an optical path separation element. Here, prism 4 is provided with the No. 1 prism structural member 41 and the No. 2 prism structural member 42 joined through partially reflecting face 43 slanted toward the optical axis of a laser beam emitted from laser beam-emitting element 2. Partially reflecting face 43 transmits a laser beam emitted from laser beam-emitting element 2 toward collimating lens 5, and on the other hand, reflects light returning from optical recording medium 20 toward light-receiving element 9.

In optical head apparatus constructed in this fashion, a laser beam emitted from laser beam-emitting element 2 is transmitted through prism 4 as divergent light, and enters collimating lens 5. Consequently, unless there is sufficient control of astigmatism, small spots cannot be formed on optical recording medium 20. Therefore, for prism 4, identical materials are used to construct the No. 1 prism structural member 41 and the No. 2 prism structural member 42, and at the same time, surface precision and extent of parallelism of the No. 1 prism structural member 41 and the No. 2 prism structural member 42 are subjected to control measures.

PROBLEMS TO BE SOLVED BY THE INVENTION

Nonetheless, although in a case such as that of CD where optical recording medium of relatively low recording density is involved, good regeneration properties were obtained to some degree by conventional measures taken on prism 4, in the case of a DVD where optical recording medium has high recording density, situations occur where the permissible amount of astigmatism is exceeded, when only the control measures are taken.

The patent applicant conducted various studies on the causes for this, and as a result, found that even when identical materials were used to construct the No. 1 prism structural member 41 and the No. 2 prism structural member 42, the permissible amount of astigmatism can be exceeded, depending on the manufacturing lot and the combination of prism structural members. In other words, new findings showed that even when permissible amounts of refractive index of the No. 1 and the No. 2 prism structural members are kept in a certain range, depending on the combination of the No. 1 prism structural member 41 and the No. 2 prism structural member 42, differences in refractive index occur, although at a low level, between the No. 1 prism structural member 41 and the No. 2 prism structural member 42. This causes differences in optical path length in prism 4.

OBJECT AND SUMMARY OF THE INVENTION

In consideration of the problems listed above, the primary object of this invention is to provide optical head apparatus that enables control of scatter that occurs along the length of the optical path when a laser beam is transmitted through the prism where the No. 1 prism structural member and the No. 2 prism structural member are joined through a partially reflecting face.

In order to solve the previously described problems, this invention is directed to an optical head apparatus wherein a laser beam-emitting element, a prism used for optical path synthesis or optical path separation of incident laser beam emitted from the laser beam-emitting element, a collimating lens to convert the laser beam transmitted through the prism to parallel light flux, and an objective lens to condense parallel light flux emitted from the collimating lens on optical recording medium, all of which being located on an optical path in this order. The prism is provided with a No. 1 prism structural member and a No. 2 prism structural member joined through a partially reflecting face slanted toward optical axis of laser beam emitted from the laser beam-emitting element; in the prism, when length of the laser beam in the optical path direction in the prism, and absolute value of the difference in refractive index between the No. 1 prism structural member and the No. 2 prism structural member are respectively termed d, $\Delta n$, specified conditions are designated for a value obtained from $\Delta n \cdot d$, or for $\Delta n$.

The inventor noticed that when the laser beam is transmitted through the prism, depending on the location where the laser beam passes through the prism, there was a change in the proportion of the total optical path length of the laser beam assumed by the optical path length of the No. 1 prism structural member and by the optical path length of the No. 2 prism structural member; in this invention, value obtained from $\Delta n \cdot d$, or for $\Delta n$ is controlled. In other words, when absolute value ($\Delta n$) of the difference in refractive index between the No. 1 prism structural member and the No. 2 structural member is kept small, no matter at what location the laser beam passes through the prism, because there is no difference in optical path length ($\Delta n \cdot d$), laser beam having synchronized phase is emitted from the prism. Therefore, it is possible to suppress astigmatism due to the prism. In contrast to this, when absolute value ($\Delta n$) of the difference in refractive index between the No. 1 prism structural member and the No. 2 structural member is made deliberately large, it is also possible to correct astigmatism occurring in other optical parts by means of the astigmatism due to the prism.

In this invention, when the wavelength of the laser beam is termed $\lambda$, within the effective pupil in the prism, for example, $\Delta n \cdot d$ is controlled to satisfy the following equation:

$$5 > \Delta n \cdot d / \lambda$$

By constructing in this fashion, no matter at what location the laser beam passes through the prism, the difference in optical path length (Δn·d) at each location is not greater than 5 times the wavelength. Thus it is possible to suppress astigmatism due to the prism.

In this invention, when refractive index of the prism is termed n, for example, Δn is controlled to satisfy the following equations:

$$n \cdot d \leq 6.0$$

$$\Delta n \leq 0.0005$$

For example, when refractive index n of the prism is 1.5, and length d in the optical path direction of the laser beam in the prism is 4.5 mm, $$\Delta n \leq 0.0005$$

By constructing the optical head in this fashion, the difference in optical path length (Δn·d) at each location along the path is small, thus it is possible to suppress astigmatism due to the prism.

In this invention, as seen from the collimating lens, for example, numeral aperture on the side of the laser beam-emitting element is 0.1 or more, numeral aperture on the side of the optical recording medium is 0.6 or more.

DESCRIPTION OF THE PREFERRED EMBODIMENTS

Below, one example of optical head apparatus of this invention is explained with the figures as reference.

Figure 1:
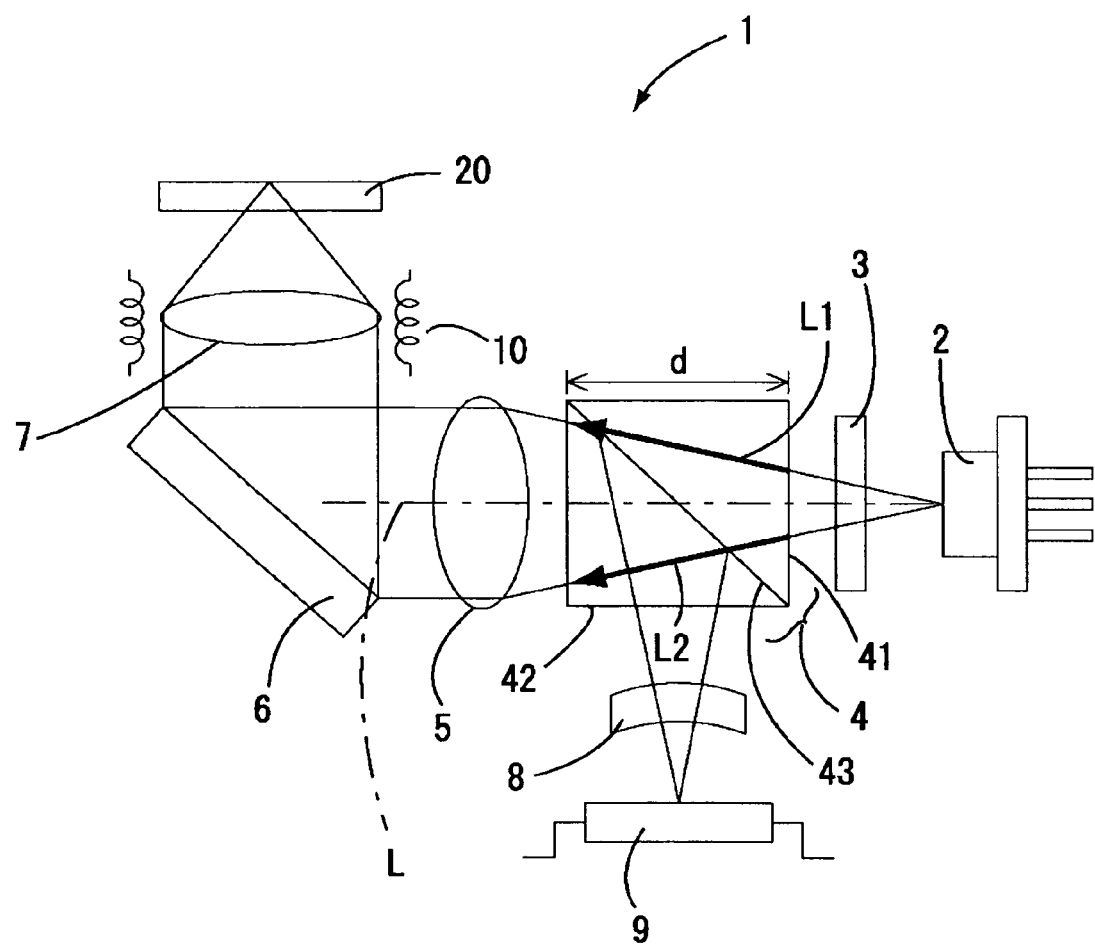
FIG. 1 is a simplified structural diagram showing an optical system in the center of optical head apparatus.
Figure 2:
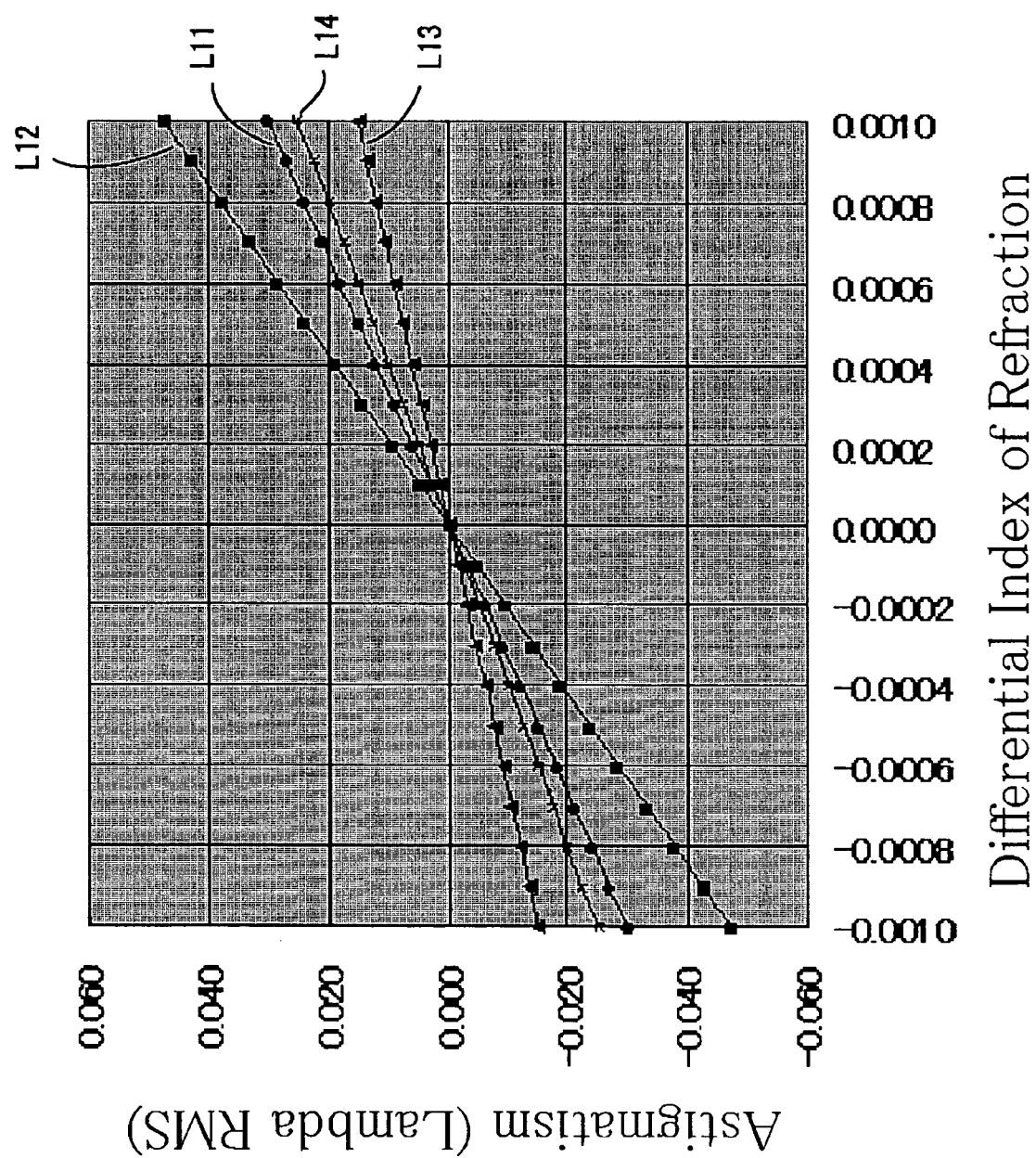
FIG. 2 is a graph showing the relationship in optical head apparatus between size and numeral aperture of the prism and astigmatism due to the prism.

FIG. 1 is a simplified structural diagram showing optical system in the center of optical head apparatus of this example. FIG. 2 is a graph showing the relationship in optical head apparatus between the size and numeral aperture of the prism and astigmatism due to the prism.

As shown in FIG. 1, optical head apparatus 1 is a device that performs information recording, information regeneration on optical recording medium such as DVD; laser beam-emitting element 2 comprising a laser diode emitting laser beam of wavelength 650 nm bandwidth, grating 3 for splitting laser beam emitted from this laser beam-emitting element 2 into 3 beams, prism 4 used for optical path synthesis or optical path separation of laser beam emitted from laser beam-emitting element, entering through grating 3, collimating lens 5 to convert laser beam transmitted through prism 4 to parallel light flux, raised mirror 6, and objective lens 7 to condense parallel light flux emitted from collimating lens 5 on optical recording medium 20, are located on an optical path in this order.

Prism 4 has a structure wherein triangular No. 1 prism structural member 41 and similarly triangular No. 2 prism structural member 42 are joined through partially reflecting face 43; partially reflecting face 43 is slanted at an angle of 45° toward optical axis L of laser beam emitted from laser beam-emitting element 2.

Further, light-receiving element 9, and sensor lens 8 are located at the side of prism 4; returning light reflected from optical recording medium 20 enters prism 4 through objective lens 7, raised mirror 6, collimating lens 5, is directed toward sensor lens 8 and light-receiving element 9 by means of partially reflecting face 43 that bends its optical axis L at a right angle.

Here, as seen from collimating lens 5, numeral aperture on the side of laser beam-emitting element 2 is, for example, 0.1 or more, numeral aperture on the side of optical recording medium 20 is, for example, 0.6 or more. In very concrete terms, numeral aperture on the side of laser beam-emitting element 2 is, for example, about 0.13, numeral aperture on the side of optical recording medium 20 is, for example, about 0.6.

Further, for objective lens 7, lens drive device 10 is constructed, that drives the objective lens in the focusing direction and the tracking direction.

In optical head apparatus constructed in this fashion, the No. 1 prism structural member 41 and the No. 2 prism structural member 42 that constitute prism 4 are molded from transparent materials such as identical resin materials or glass, but in this embodiment, the inventor noticed that a difference in refractive index exists between the No. 1 prism structural member 41 and the No. 2 prism structural member 42, depending on the combination of the No. 1 prism structural member 41 and the No. 2 prism structural member 42; when length of laser beam in optical path direction in prism 4, the absolute value of the difference in refractive index between the No. 1 prism structural member 41 and the No. 2 prism structural member 42 are respectively termed d, Δn, value obtained from Δn·d, or Δn are controlled as follows.

First, when wavelength of laser beam is termed λ, within effective pupil in prism 4, Δn·d is controlled to satisfy the following equation:

$$5 > \Delta n \cdot d / \lambda$$

In other words, in prism 4, for light component following optical path shown by arrow sign L1, optical path length in prism 4 is mostly the optical path length in the No. 1 prism structural member 41, on the other hand, for light component following optical path shown by arrow sign L2, optical path length in prism 4 is mostly the optical path length in the No. 2 prism structural member 42, but in this embodiment, the difference in optical path length in this case is 5 wavelengths or less.

Consequently, in this embodiment, because the difference in optical path length is small when laser beam is transmitted through prism 4, astigmatism due to prism 4 can be suppressed. Therefore, small spots can be formed on optical recording medium 20.

Further, in this embodiment, when refractive index of prism 4 entity is termed n, Δn can be controlled to satisfy the following equation:

$$n \cdot d \leq 6.0$$

$$\Delta n \leq 0.0005$$

In more concrete terms, Δn may be controlled to satisfy $$n \cdot d \leq 6.8$$

$$\Delta n \leq 0.0005$$

For example, when refractive index n of prism 4 is 1.5, and length d in the direction of the optical path of the laser beam in prism 4 is 4.5 mm, the designated relationship is $$\Delta n \leq 0.0005$$

Even under such designated conditions, in prism 4, the difference in optical path length is small between light component following optical path shown by arrow sign L1, and light component following optical path shown by arrow sign L2. Consequently, astigmatism due to prism 4 can be suppressed; thus, small spots can be formed on optical recording medium 20.

In the previously described practical embodiment, in prism 4, explanation was made using as example, the case where length d in the optical path direction of the laser beam in prism 4 is 4.5 mm, and as seen from collimating lens 5, numeral aperture on the side of laser beam-emitting element 2 is about 0.13. This invention is also applicable to the case where length in the optical path direction of the laser beam in prism 4, and as seen from collimating lens 5, numeral aperture on the side of laser beam-emitting element 2 meet other conditions.

For example, FIG. 2 shows the relationship to astigmatism of the difference in refractive index (±Δn) between the No. 1 prism structural member 41 and the No. 2 prism structural member 42, when length in the optical path direction of the laser beam in prism 4 and as seen from collimating lens 5, numeral aperture on the side of laser beam-emitting element 2 are changed respectively. As shown in FIG. 2, when absolute value Δn of the difference in refractive index between the No. 1 prism structural member 41 and the No. 2 prism structural member 42 is designated to be 0.0005 or less, astigmatism due to prism 4 can be suppressed to a small value.

Further, in FIG. 2, straight line L11 shows the results in the case where length d in the optical path direction of the laser beam in prism 4 is 4.5 mm, and as seen from collimating lens 5, numeral aperture on the side of laser beam-emitting element 2 is 0.108; straight line L12 shows the results in the case where length d in the optical path direction of the laser beam in prism 4 is 4.5 mm, and as seen from collimating lens 5, numeral aperture on the side of laser beam-emitting element 2 is 0.136. Furthermore, straight line L13 shows the results in the case where length d in the optical path direction of the laser beam in prism 4 is 3.0 mm, and as seen from collimating lens 5, numeral aperture on the side of laser beam-emitting element 2 is 0.108; straight line L14 shows the results in the case where length d in the optical path direction of the laser beam in prism 4 is 3.0 mm, and as seen from collimating lens 5, numeral aperture on the side of laser beam-emitting element 2 is 0.136.

It is clear from these results that the longer the length of length d in the optical path direction of the laser beam in prism 4, the larger the inclination toward astigmatism. Therefore, for absolute value Δn of difference in refractive index between No. 1 prism structural member 41 and No. 2 prism structural member 42, the product Δn·d of absolute value Δn of the difference in refractive index and length d in the optical path direction of the laser beam in prism 4 should be controlled to have a value not greater than the designated value, for example, less than 5 times the wavelength being used.

Figure 3:
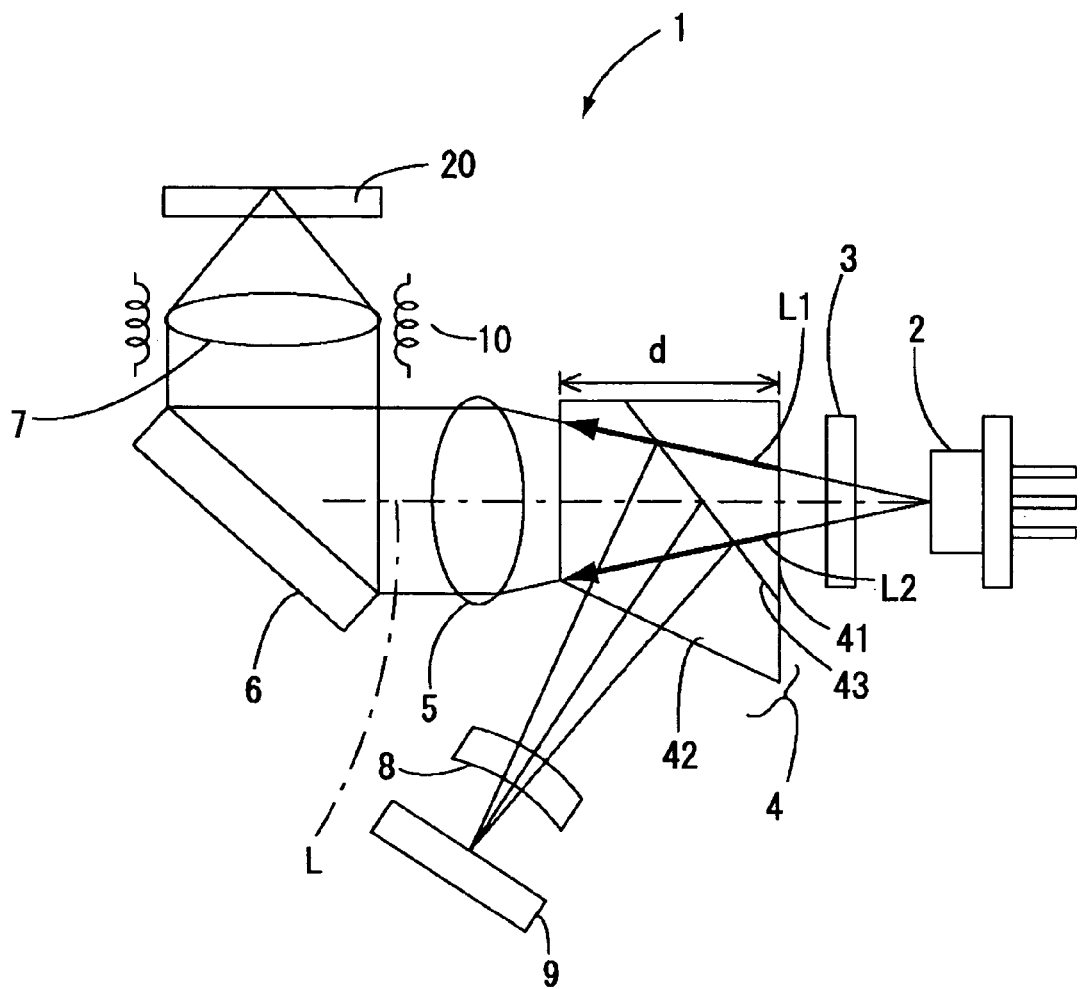
FIG. 3 is a simplified structural diagram showing another optical system in the center of optical head apparatus.

Further, in the previously described embodiment, explanation was made using as example, prism 4, where rectangular 3-sided No. 1 prism structural member 41 and No. 2 prism structural member 42 are joined through partially reflecting face 43, but as shown in FIG. 3, this invention is applicable to the case of optical head apparatus 1, where partially reflecting face 43 has an angle other than 45° toward the optical axis of laser beam emitted from laser beam-emitting element 2.

Furthermore, in the previously described embodiment, the structure is such that absolute value (Δn) of the difference in refractive index between the No. 1 prism structural member 41 and the No. 2 prism structural member 42 is small enough to suppress astigmatism due to prism 4, but in contrast to this, absolute value (Δn) of the difference in refractive index between the No. 1 prism structural member 41 and the No. 2 structural member 42 can be made deliberately large, to correct astigmatism occurring in other optical parts by means of astigmatism occurring in prism 4.

As explained above, in the optical head apparatus of this invention, the inventor noticed that when a laser beam is transmitted through the prism, depending on the location where the laser beam passes through the prism, there was change in the proportion of the total optical path length of the laser beam assumed by the optical path length of the No. 1 prism structural member and by the optical path length of the No. 2 prism structural member; optical path length at each point or difference in refractive index between No. 1 prism structural member 41 and the No. 2 prism structural member 42 are controlled. Consequently, no matter at what location the laser beam passes through the prism, because there is no difference in optical path length, the effect is such that astigmatism due to the prism can be suppressed.

While the foregoing description and drawings represent the present invention, it will be obvious to those skilled in the art that various changes may be made therein without departing from the true spirit and scope of the present invention.

DESCRIPTION OF REFERENCE SYMBOLS

1. Optical head apparatus
2. Laser beam-emitting element
4. Prism
5. Collimating lens
7. Objective lens
9. Light-receiving element
10. Objective lens drive device
20. Optical recording medium
41. No. 1 prism structural member
42. No. 2 prism structural member
43. Partially reflecting face

What is claimed is:

1. In an optical head apparatus, comprising:
  a laser beam-emitting element, a prism used for optical path synthesis or optical path separation of an incident laser beam emitted from said laser beam-emitting element, a collimating lens to convert said laser beam transmitted through said prism to parallel light flux, and an objective lens to condense parallel light flux emitted from said collimating lens on optical recording medium, being located on an optical path in the recited order;
  said prism being provided with a No. 1 prism structural member and a No. 2 prism structural member joined through a partially reflecting face slanted toward an optical axis of said laser beam emitted from said laser beam-emitting element; and
  said optical head apparatus having specified conditions designated for a value obtained from Δn·d, or for Δn, when length of said laser beam in an optical path direction in said prism, and absolute value of the difference in refractive index between said No. 1 prism structural member and said No. 2 prism structural member are respectively termed d, Δn, wherein the following equation is satisfied:

$5 > \Delta n \cdot d / \lambda$ within the effective pupil in said prism, when the wavelength of said laser beam is termed λ.

2. In an optical head apparatus, comprising:

a laser beam-emitting element, a prism used for optical path synthesis or optical path separation of an incident laser beam emitted from said laser beam-emitting element, a collimating lens to convert said laser beam transmitted through said prism to parallel light flux, and an objective lens to condense parallel light flux emitted from said collimating lens on optical recording medium, being located on an optical path in the recited order;

said prism being provided with a No. 1 prism structural member and a No. 2 prism structural member joined through a partially reflecting face slanted toward an optical axis of said laser beam emitted from said laser beam-emitting element; and said optical head apparatus having specified conditions designated for a value obtained from Δn·d, or for Δn, when length of said laser beam in an optical path direction in said prism, and absolute value of the difference in refractive index between said No. 1 prism structural member and said No. 2 prism structural member are respectively termed d, Δn, wherein the following equation is satisfied:

$n \cdot d \geq 26.0$ $\Delta n \leq 0.0005$ when the refractive index of said prism is termed n.

3. Optical head apparatus as in claim 2, as seen from said collimating lens, said apparatus having numeral aperture 0.1 or more on the side of said laser beam-emitting element, and having the numeral aperture 0.6 or more on the side of said optical recording medium.

4. Optical head apparatus as in claim 2, wherein the following equation is satisfied:

$5 > \Delta n \cdot d / \lambda$ within the effective pupil in said prism, when the wavelength of said laser beam is termed λ.

* * * * *